United States Patent

[11] 3,550,753

| [72] | Inventor | Richard B. Culp |
| | | Atlanta, Ga. |
| [21] | Appl. No. | 751,619 |
| [22] | Filed | Aug. 9, 1968 |
| [45] | Patented | Dec. 29, 1970 |
| [73] | Assignee | Lockheed Aircraft Corporation |
| | | Burbank, Calif. |

[54] POWERED DRIVE ASSEMBLY
4 Claims, 6 Drawing Figs.

| [52] | U.S. Cl. | 198/109 |
| [51] | Int. Cl. | B65g 41/00 |
| [50] | Field of Search | 198/109, 184, 129 |

[56] References Cited
UNITED STATES PATENTS
883,016 3/1908 Heck.......................... 198/184X FOREIGN PATENTS
586,926 4/1947 Great Britain................ 198/109
698,477 10/1953 Great Britain................ 198/184

Primary Examiner—Edward A. Sroka
Attorney—James A. Hinkle and George C. Sullivan ABSTRACT: A powered drive assembly for moving containers or pallets of cargo in a remote location. Located in a cargo supporting floor, the assembly has a central pivot about which a pair of U-shaped swing arms are pivoted by their proximal ends while the distal ends each mount a rotatable pulley. An endless belt encompasses the pulleys and rises above the cargo floor thereby to engage the bottom surface of the cargo container. Motive means are connected to one or both pulleys to drive the endless belt and thereby move the container. The swing arms are resiliently biased toward the container, but are depressed by the container to a point whereby the endless belt is at the approximate level of the cargo floor when the container fully covers the drive assembly.

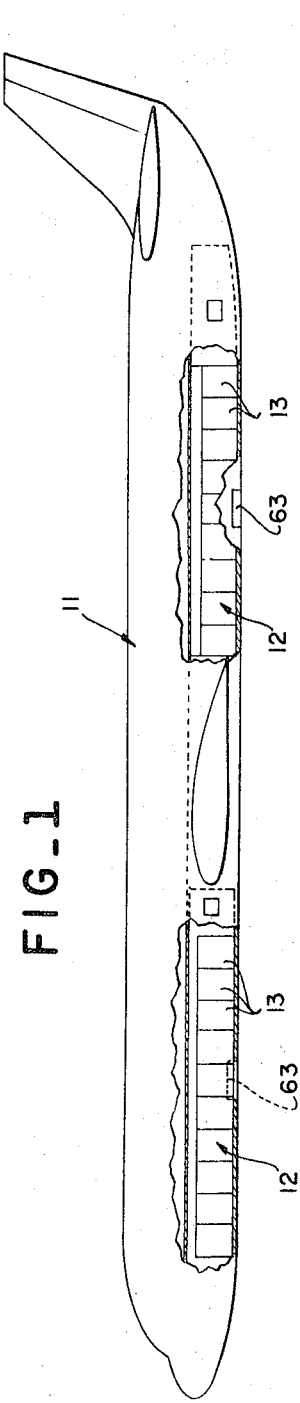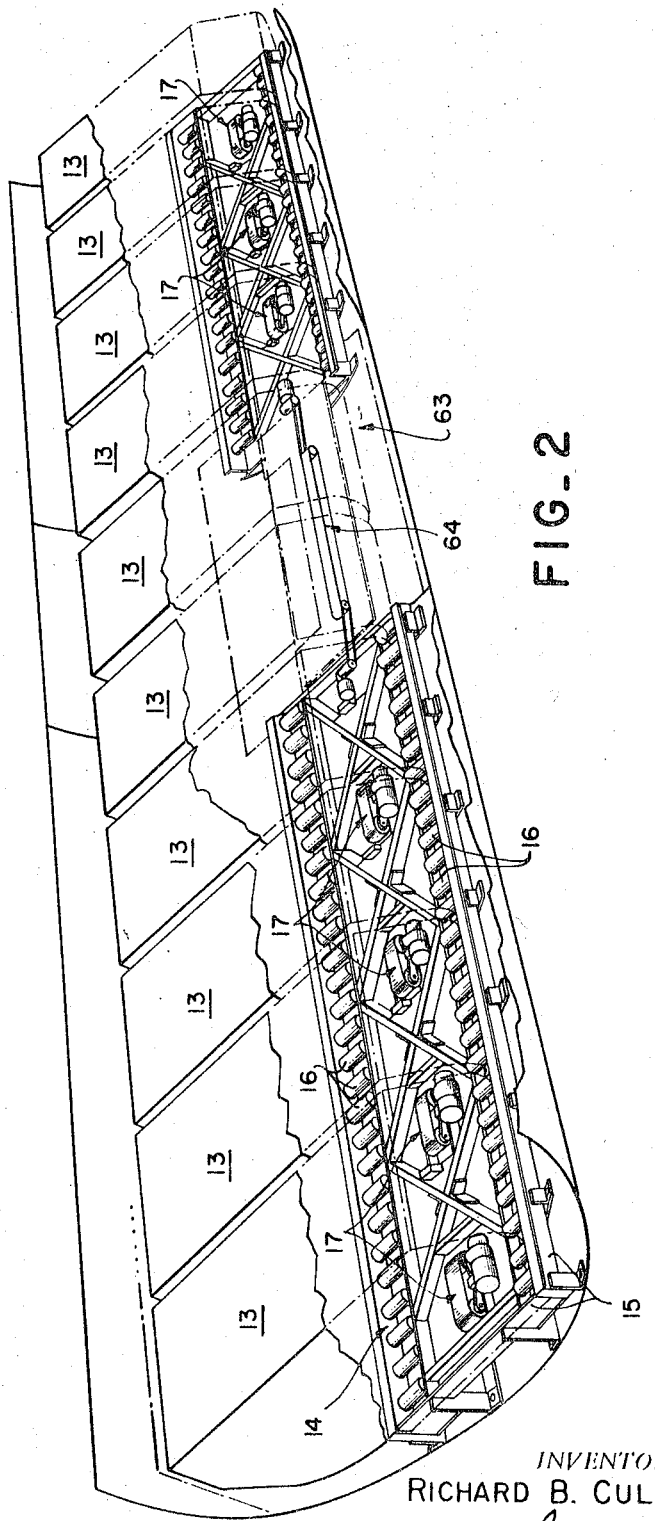

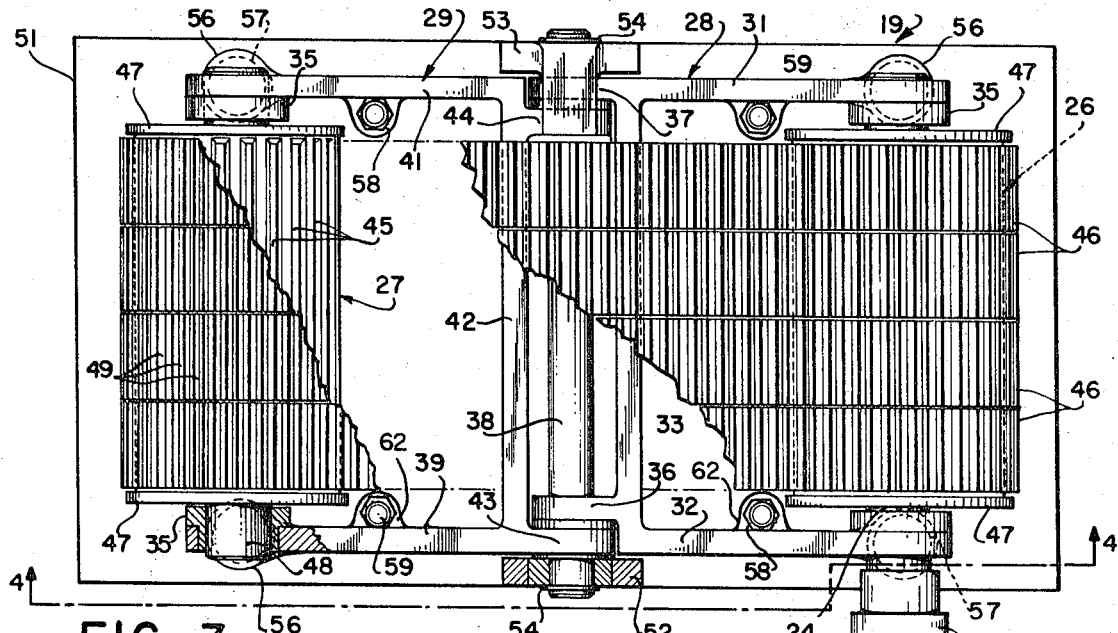
FIG. 3
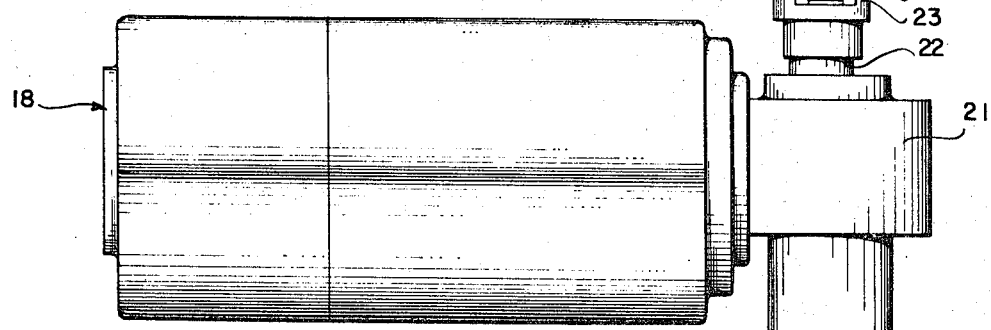
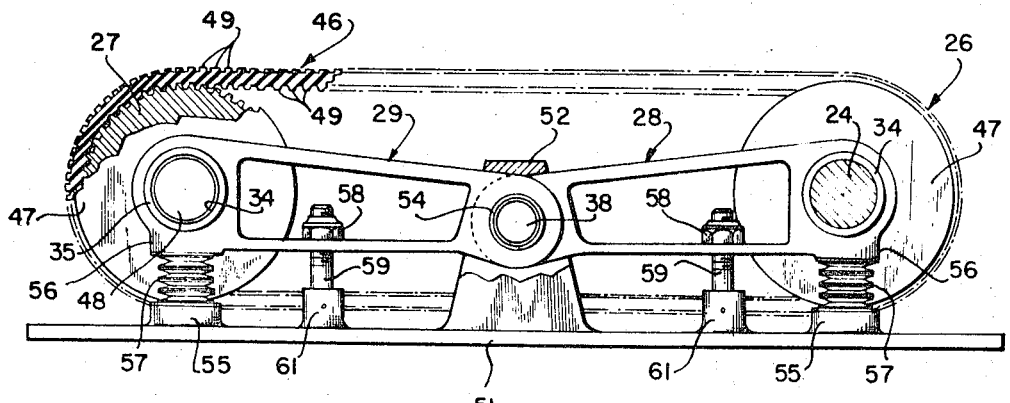
FIG. 4
INVENTOR.
RICHARD B. CULP
BY George C. Sullivan, Agent
James A. Hinkle
Attorney

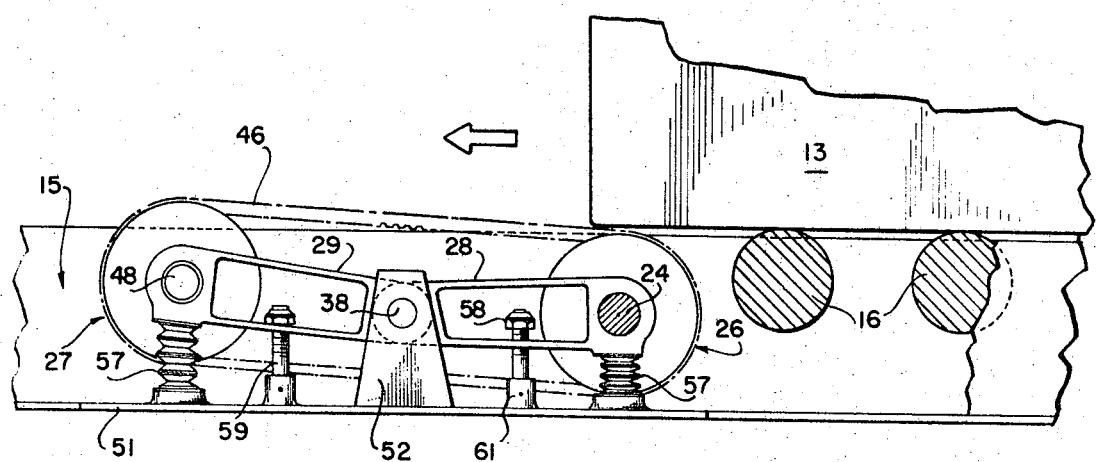
FIG_5
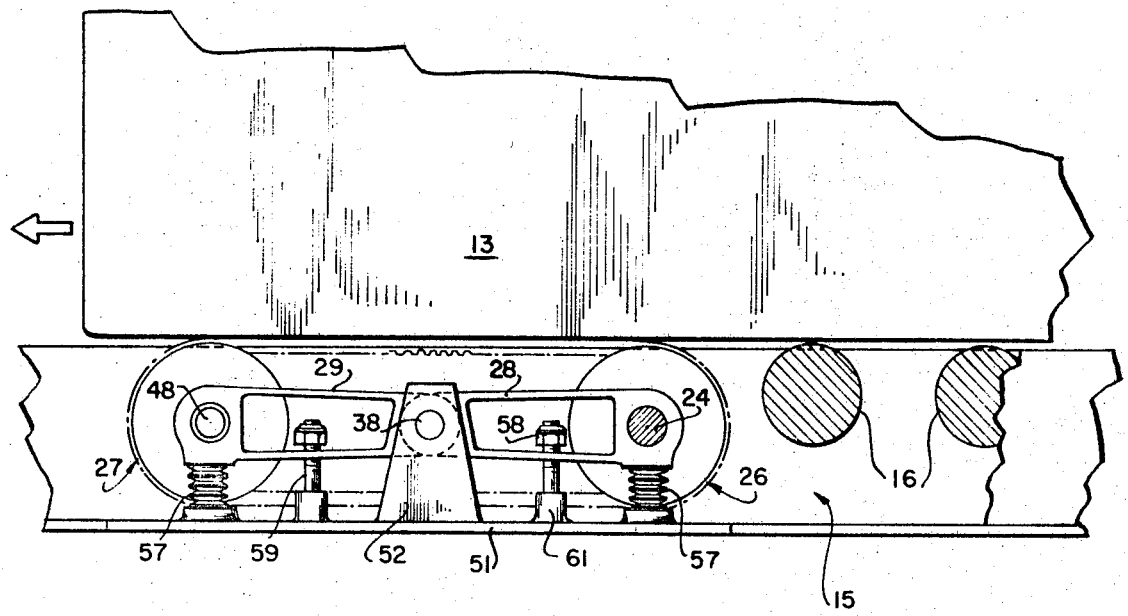
FIG_6

POWERED DRIVE ASSEMBLY

This invention relates to a powered drive assembly and, more particularly, to a drive assembly that is to be employed in the moving of containers or pallets of cargo.

In previous cargo handling apparatus, pallets or containers generally were moved about by hand, and in particular, one common method was to equip the cargo floor with a system of roller supports to facilitate such movement. While this may be adequate for small loads moved about short distances, it has become apparent that such a system has serious limitations when it comes to moving containers or pallets weighing several hundred or even thousands of pounds. Such weights have now become commonplace in cargo handling facilities.

The aircraft cargo industry is a good example where a need for the present type of powered drive assembly is evident, especially with the advent of aircraft having large cargo capacities. These aircraft have designed for them specialized cargo containers which effectively utilize all available space by being configured to the dimensions of the cargo hold. Because of the weight-carrying capabilities of these containers, and due to the extraordinary length of the cargo holds, it has become practically necessary to move the containers by mechanized means.

It is to the above-mentioned considerations that this invention is directed. Basically, the present powered drive assembly is so mounted and configured that it can be remotely activated to independently move the cargo containers into aligned relation within a confined cargo hold and thereby eliminate the necessity of for manhandling of the containers. The assembly is of small size and weight and may be easily placed in a cargo-supporting floor or other convenient place so as to frictionally engage the container, thereby propelling it along the cargo hold to the desired receiving area. While it has just been mentioned that the present invention finds particular utilization in aircraft cargo industries, it should be noted that the invention has particular applicability in any situation where relatively large items are to be moved about a generally planar surface. The present powered drive assembly is so designed as to be manufactured at relatively a low cost and need only very limited maintenance.

Other objects, advantages, and capabilities of the invention will become apparent from the following description taken in conjunction with the accompanying drawings showing only a preferred embodiment of the invention.

In the drawings:

FIG. 1 is an elevation view of an aircraft with portions broken away showing the cargo hold with cargo containers therein;

FIG. 2 is a partial perspective view of the cargo hold of the aircraft with portions broken away showing the construction thereof and illustrating one location possible for the placement of the powered drive assembly;

FIG. 3 is a plan view with portions broken away of the powered drive assembly of the present invention;

FIG. 4 is a partial section view taken along lines 4—4 of FIG. 3;

FIG. 5 is an elevation view similar to that of FIG. 4, however, showing the action of the powered drive assembly as a load engages the assembly; and FIG. 6 is an elevation view similar to that of FIG. 5, however, showing a load encompassing the entire top portion of the powered drive assembly.

Referring to the drawings wherein like reference characters designate corresponding parts throughout several figures, and referring especially to FIGS. 1 and 2, numeral 11 indicates one possible environment for the present invention which, in this case, is an aircraft. The cargo hold of the aircraft is indicated by numeral 12, having placed therein numerous cargo containers 13 which are generally fitted and configured to the shape of the hold. The cargo hold generally includes a cargo floor 14 comprising supporting structures 15 in the form of beams and braces suitably interconnected to form a rigid structure.

A common expedient utilized in cargo floors of this type are floor rollers 16 or other suitable members which facilitate the movement of heavy containers in a fore and aft direction thereupon. In the illustrated case the rollers 16 are suitably secured in the supporting structures 15 so that the cargo containers 13 engage the rollers and are supported thereupon.

Located between the parallel rows of rollers 16 is the powered drive assembly 17 of the instant invention. The location of the powered drive assembly shown herein is but exemplary of the many possible locations in which it could be placed even in an aircraft installation. However, the placement, as shown herein, has proved to be very practical and it is believed that one assembly 17 placed in the cargo floor 14 in such a manner as to be engaged with each cargo container 13 when it is in its secured position will prove to be most feasible.

The powered drive assembly comprises generally two main parts, the electric motor 18 and the load-engaging mechanism 19. The motor 18 is one of low profile and high output torque capacity having a gear box 21 through which the output power is transmitted at 90° to the center line of the motor through an output shaft 22 to which is connected coupling half 23. The drive shaft 24 of the load engaging mechanism has affixed thereto a coupling half 25 which mates with coupling half 23 to derive power therefrom to operate the load-engaging mechanism. In the specific embodiment described herein the electric motor 18 is mounted parallel to the load-engaging mechanism 19 and power is transmitted at 90° to the motor. It should be noted that certain situations may arise wherein it is desired to mount the electric motor at a more remote location with respect to the load engaging mechanism and the description herein should not be construed to preclude that possibility. It should also be noted that at times it may be feasible to mount the motor in a straight shaft relationship with respect to the drive shaft of the load-engaging mechanism without transferring the output torque through a gear box.

The load-engaging mechanism portion of the powered drive assembly generally comprises a pair of spaced apart pulleys 26 and 27 with pulley 26 being the drive pulley and the idle pulley being identified by numeral 27. These pulleys are mounted in substantially U-shaped swing arms 28 and 29 respectively. Swing arm 28 has a pair of parallel disposed arms 31 and 32 interconnected by a connecting leg 33 which maintains the arms 31 and 32 in spaced-apart relation. Near the distal end of each of the arms 31 and 32 there is a bearing-receiving aperture 34 in which suitable bearings 35 are mounted. Swing arm 28 has extending rearwardly from the connecting leg 33 a pair of swing arm pivots 36 and 37. Each of these arm pivots are apertured so as to be freely rotatable about hinge shaft 38 and it should be noted from FIG. 3 that arm pivot 37 is an inline extension of free arm 31 while the arm pivot 36 is offset from a projected imaginary line corresponding to the center line of free arm 32. The reason for such a construction is to allow swing arms 28 and 29 to matingly engage upon the hinge shaft 38 and also to allow commonality of parts.

Swing arm 29 is essentially identical to swing arm 28 in that it is of U-shaped construction, having a pair of free arms 39 and 41 interconnected by a connecting leg 42. The distal ends of each of the free arms 39 and 41 have a bearing-receiving aperture 34 to accommodate suitable bearings 35 in the same manner as described for swing arm 28. Projecting rearwardly from the connecting leg 42 are swing arm pivots 43 and 44 which are freely rotatable about the hinge shaft 38. Pivot 43 projects from the connecting leg 42 along an imaginary extension of free arm 39 while pivot 44 projects rearwardly from the connecting leg 42 in a manner which is offset from a projected imaginary center line of free arm 41.

As previously mentioned, swing arm 28 supports drive pulley 26 which, in the embodiment described herein, is the pulley to which the motive forces are applied. Drive pulley 26 is keyed to drive shaft 24 which in turn is rotatively mounted in bearings 35. The drive pulley has a series of longitudinally disposed ribs 45 disposed thereupon to mate with one or more drive belts 46. At remote ends of the drive pulley there is located an annular raised stop 47 for the purpose of preventing the drive belts 46 from slipping off the pulley. The general construction of the drive pulley 26 should be such that extremely heavy loads may be carried upon the pulley and it should be strong enough to adequately drive the encountered loads across the powered drive assembly in conjunction with the drive belts moved by the drive pulley.

The idle pulley 27 is essentially identical in construction to the drive pulley 26 having a plurality of longitudinally disposed pulley ribs 45 flanked by a belt stop at each end of the pulley indicated by numeral 47 and it is keyed to idle pulley shaft 48 which is freely rotatable within the respective bearings 35 of the swing arm 29. While pulley 27 is a driven pulley, this should not be taken to restrict its operation to such a mode since it may be desired at times to actively drive this pulley to either increase torque of the entire assembly or to possibly drive it in an opposite direction when compared to drive pulley 26.

The endless drive belts 46 which engage both pulleys are shown in the present drawings as being several in number; however, this is a factor which may be changed as conditions dictate. It has been found that a single belt is quite operable as are other numbers of belts. The drive belts shown, and with particular reference with FIG. 4, are indicated as having both upper and lower surfaces divided into an endless succession of transverse rib members 49. It has been found that operating characteristics in the environment which the invention is to be put are enhanced by having at least the undersurface of the drive belts ribbed to mate with the ribs of both the drive pulley and the idle pulley. However, the upper surface, or load-engaging surface, of the drive belts may or may not be ribbed, depending upon the user's preference and needs.

The supporting structure for the swing arms and associated pulleys comprises a base plate 51 having at its midpoint in flanking relationship a pair of upwardly projecting hinge shaft support plates 52 and 53. Near the upper portion of each of the support plates is an aperture in which a suitable bearing rests through which projects the hinge shaft 38. A retaining washer 54, such as a snap ring washer, is employed to maintain the hinge shaft 38 in a centered relationship with respect to each of the support plates 52 and 53. Directly beneath each end of the two pulley shafts 24 and 48 and mounted upon the base plate 51 is an upwardly projecting flat-topped base plate spring support 55. Correspondingly, directly beneath each of the ends of the pulley shafts and integral with the lower side of the distal ends of the swing arms 28 and 29 is a depending swing arm spring support 56 which is in substantial vertical alignment with respect to the base plate spring supports 55. Fixedly mounted between the spring supports 55 and 56 are a series of Belleville springs 57 maintained under desired compression to resiliently bias, in an upward manner, the swing arms and consequently the drive belts so that the drive belts will frictionally engage a load as it passes thereacross.

To maintain a desired compression upon the Belleville springs and to prevent the tension in the drive belts 46 from moving the swing arms upwardly to an undesired point, a stop nut 58 and associated structure is provided upon at least one free arm of each of the swing arms. The stop nut 58 is screwed down upon a stop bolt 59 which is secured in a bracket 61 integrally disposed upon the base plate 51. Each of the free arms of each swing arm preferably has a horizontally disposed bracket 62 connected to the lower portion of each free arm and has an aperture therethrough to receive the stop bolt 59. The stop nut 58 is normally tightened down upon the stop bolt a desired degree, thereby compressing the Belleville springs to a correct compression.

In operation the present invention would be placed in the cargo floor, or other suitable place of the cargo hold of the aircraft, as previously described above, at convenient intervals which correspond to center-to-center spacing of the cargo containers 13. It is anticipated that for aircraft use each of the drive assemblies 17 would be individually powered from an external source so that they could be independently operated.

For illustration purposes the operation of the invention will be described as being integral with an aircraft cargo-loading system. Attention is directed to FIG. 2 wherein the belly cargo hold 12 of the aircraft 11 will normally have a series of cargo-loading hatches 63 through which the cargo containers 13 are inserted into the hold. The cargo will initially rest upon a transfer plate 64 of suitable design and for illustrative purposes, in FIG. 2 the transfer plate is shown to be a movable conveyor belt. However, any transfer device could easily be utilized.

The cargo container 13 would then be transferred to the desired area of the hold, and as it is moved off of the transfer plate 64 it will be moved into the vicinity of the first encountered powered drive assembly 17. Referring specifically now to FIG. 5, in which the load or container 13 is shown approaching the drive assembly 17, it can be seen that as the leading edge of the container contacts the drive pulley 26, which has been previously energized so that the drive belts are being moved, the leading edge depresses the engaged drive pulley, thereby moving the swing arm 28 downwardly to apply more tension to the drive belts 46.

As this additional tension is applied to the drive belts the gripping surfaces of the drive belts are engaging the bottommost surface of the cargo container 13 and by this action the container is moved across the drive assembly 17 by the action of the moving drive belt. As the leading edge of the cargo container 13 approaches and overrides the idle pulleys 27 it can be seen, from FIG. 6, that swing arm 29 is depressed in a manner similar to the other swing arm and the full designed tension is then applied to the drive belts. With both swing arms being depressed the Belleville springs 57 are exerting a countering force to actively maintain the pulleys 26 and 27 firmly against the bottom surface of the cargo container. This maintains the maximum amount of frictional pressure against the cargo container so that there is little or no slippage between the drive belts and the container. As the drive assemblies 17 are preferably controlled from an external source they may be disengaged or stopped at any desired time, thus stopping the movement of the cargo containers. Normally when an individual container reaches its desired storage location, the particular assembly 17, upon which the container rests, would be stopped and the operator would latch the cargo container in place. To remove the cargo containers from the cargo hold the process would just be reversed and the motor drive, being reversible, would operate the powered drive assemblies 17 in a reverse direction.

I claim:

1. A drive assembly comprising a first and second swing arm assembly, each swing arm assembly adapted to be mounted for rotation about a common hinge shaft, support means affixed to a base member and flanking the swing arm assemblies and rotatably engaging the ends of the hinge shaft, the distal end of each of the swing arm assemblies having an aperture therethrough to rotatably receive a pulley shaft, a cylindrical-shaped pulley rotatably supported on each said pulley shaft, endless belt means interconnecting the pulleys for concurrent movement, drive means coupled to at least one pulley shaft to transmit drive power thereto, resilient means for biasing the swing arms away from the base member so that the belt means are maintained in frictional driving contact with a load placed thereupon, the resilient means adapted to concurrently bias both swing arms away from the base member and to automatically maintain the unloaded belt means in a predetermined datum plane until a load is placed thereupon.

2. A drive assembly as set forth in claim 1 wherein the swing arm assemblies are of generally U-shaped configuration.

3. A drive assembly as set forth in claim 1 wherein each of the swing arm assemblies have parallel spaced-apart support arms interconnected at the proximal ends by a base leg, each base leg having affixed thereto a pair of spaced apertured pivots, the pivots adapted to be mounted for rotation about the hinge shaft.

4. A drive assembly comprising a first and second swing arm assembly, each swing arm assembly adapted to be mounted for rotation about a common hinge shaft, support means affixed to a base member and flanking the swing arm assemblies and rotatably engaging the ends of the hinge shaft, the distal end of each of the swing arm assemblies having an aperture therethrough to rotatably receive a pulley shaft, a cylindrical-shaped pulley rotatably supported on each said pulley shaft, endless belt means interconnecting the pulleys for concurrent movement, drive means coupled to at least one pulley shaft to transmit drive power thereto, each of the swing arm assemblies having generally a U-shaped configuration and further having parallel spaced-apart support arms interconnected at the proximal ends by a base leg, each base leg having affixed thereto a pair of spaced apertured pivots, the pivots adapted to be mounted for rotation about the hinge shaft, resilient means for biasing the swing arms away from the base member and which are interposed in compression between the swing arms and the base member whereby the belt means are maintained in frictional driving contact with the load placed thereupon.